(12) United States Patent
   Kikuchi

(10) Patent No.: US 9,367,278 B2
(45) Date of Patent: Jun. 14, 2016

(54) IMAGE PROCESSING APPARATUS, IMAGE FORMING APPARATUS, AND IMAGE PROCESSING METHOD

(71) Applicant: KYOCERA Document Solutions Inc., Osaka-shi, Osaka (JP)

(72) Inventor: Ryota Kikuchi, Osaka (JP)

(73) Assignee: KYOCERA Document Solutions Inc., Osaka-shi (JP)

(*) Notice: Subject to any disclaimer, the term of this patent is extended or adjusted under 35 U.S.C. 154(b) by 0 days.

(21) Appl. No.: 14/688,950

(22) Filed: Apr. 16, 2015

(65) Prior Publication Data

US 2015/0310317 A1 Oct. 29, 2015

(30) Foreign Application Priority Data

Apr. 23, 2014 (JP) ................... 2014-088815

(51) Int. Cl.
   *H04N 1/40* (2006.01)
   *G06F 3/12* (2006.01)
   *H04N 1/60* (2006.01)

(52) U.S. Cl.
   CPC ............ *G06F 3/1297* (2013.01); *G06F 3/1208* (2013.01); *G06F 3/1244* (2013.01); *G06F 3/1258* (2013.01); *G06F 3/1285* (2013.01); *H04N 1/40062* (2013.01); *H04N 1/60* (2013.01)

(58) Field of Classification Search
   None
   See application file for complete search history.

(56) References Cited

U.S. PATENT DOCUMENTS

2004/0190926 A1* 9/2004 Burkes ............... G03G 15/50
                                                          399/82
2009/0073463 A1* 3/2009 Yamada ............... H04N 1/3935
                                                          358/1.2

FOREIGN PATENT DOCUMENTS

JP          2001270193 A        10/2001

* cited by examiner

*Primary Examiner* — Vincent Rudolph
*Assistant Examiner* — Michael Burleson
(74) *Attorney, Agent, or Firm* — Alleman Hall McCoy Russell & Tuttle LLP

(57) ABSTRACT

An image processing apparatus includes a print processing portion, a first determination portion, a first determination target excluding portion, and a print color mode switching portion. The first determination portion determines, for each page of the document sheets, whether or not each of a plurality of divided areas is of a color type that is different from the print color mode. The first determination target excluding portion excludes divided areas that are determined as being of a color type that is different from the print color mode in a first set number or more of pages of the document sheets, from determination targets of the first determination portion from then. The print color mode switching portion is able to switch the print color mode during the print process when the number of divided areas that are the determination targets of the first determination portion becomes a predetermined number or smaller.

7 Claims, 6 Drawing Sheets

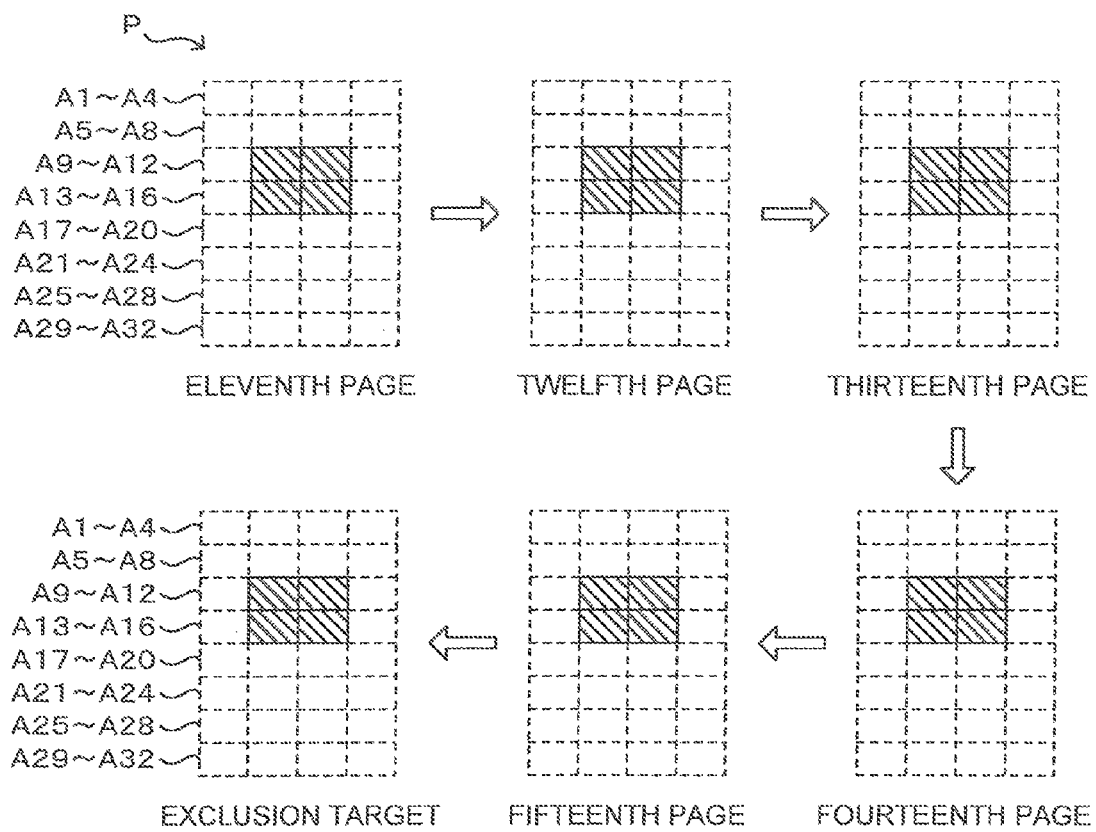

_US 9,367,278 B2_

IMAGE PROCESSING APPARATUS, IMAGE FORMING APPARATUS, AND IMAGE PROCESSING METHOD

INCORPORATION BY REFERENCE

This application is based upon and claims the benefit of priority from the corresponding Japanese Patent Application No. 2014-088815 filed on Apr. 23, 2014, the entire contents of which are incorporated herein by reference.

BACKGROUND

The present disclosure relates to an image processing apparatus that can execute a color print process.

There is generally known an image processing apparatus such as a printer that can execute a color print process based on image data of a document sheet. In this type of image processing apparatus, when a print process is executed based on image data of a document sheet, a print color mode is selected out of color mode and monochrome mode. In the color mode, a color image is printed, and in the monochrome mode, a monochrome image is printed. In addition, there is known a configuration in which a color type is automatically determined out of color and monochrome for each page of document sheets, and a print color mode is selected every predetermined number of pages based on the determination results.

SUMMARY

An image processing apparatus according to an aspect of the present disclosure includes a print processing portion, a first determination portion, a first determination target excluding portion, and a print color mode switching portion. The print processing portion executes, in a print color mode which is either a color mode or a monochrome mode, a print process based on image data of a plurality of pages of document sheets, wherein the print color mode has been set in advance. The first determination portion determines, for each page of the document sheets, whether or not each of a plurality of divided areas is of a color type that is different from the print color mode, wherein the plurality of divided areas have been set in advance. When the first determination portion determines that one or more divided areas among the plurality of divided areas are of a color type that is different from the print color mode in a first set number or more of pages of the document sheets, the first determination target excluding portion excludes the one or more divided areas from determination targets of the first determination portion thereafter, wherein the first set number has been set in advance. The print color mode switching portion is able to switch the print color mode during the print process when the number of divided areas that are the determination targets of the first determination portion becomes a predetermined number or smaller.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a diagram showing an example of how the color type of a document sheet is determined in the print color mode switching process that is executed in the image forming apparatus according to an embodiment of the present disclosure.

DETAILED DESCRIPTION

Figure 1:
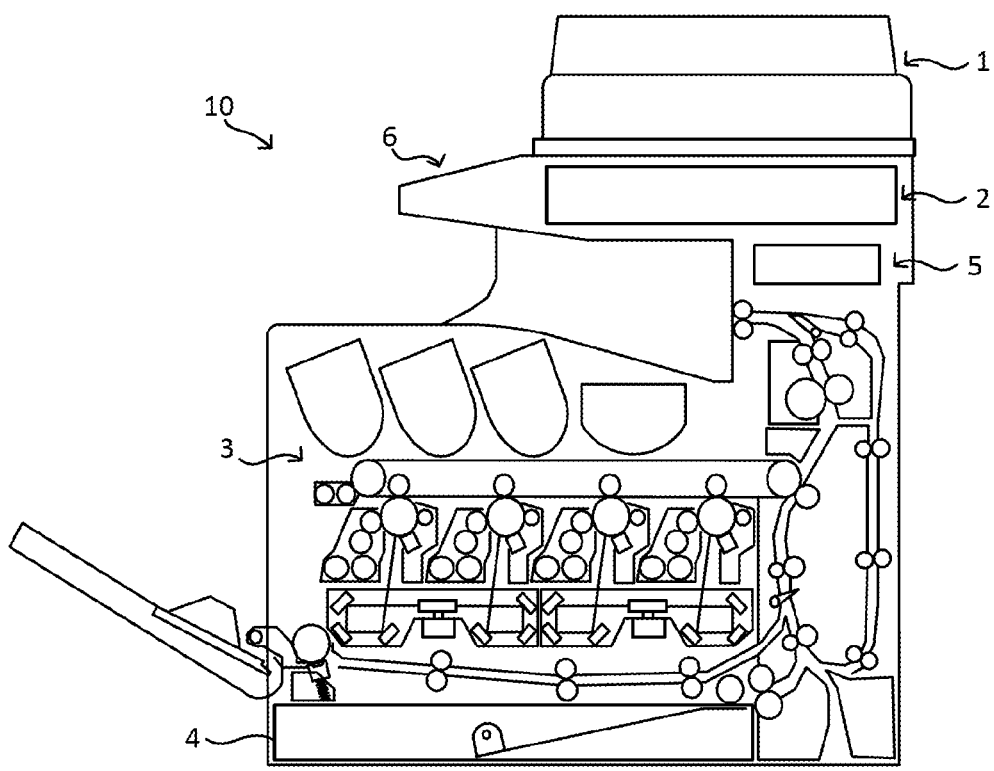
FIG. 1 is a diagram showing the configuration of an image forming apparatus according to an embodiment of the present disclosure.
Figure 2:
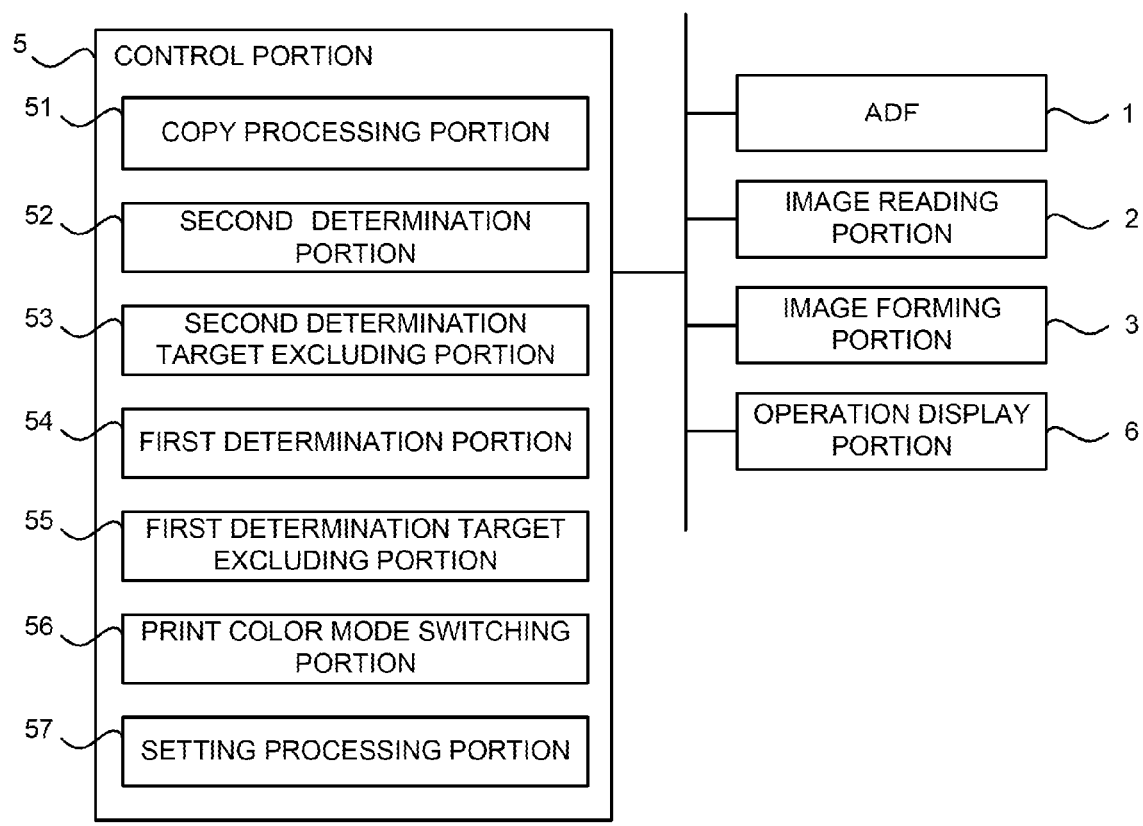
FIG. 2 is a block diagram showing the system configuration of the image forming apparatus according to an embodiment of the present disclosure.

As shown in FIGS. 1 and 2, an image forming apparatus 10 includes an ADF 1, an image reading portion 2, an image forming portion 3, a sheet feed portion 4, a control portion 5, and an operation display portion 6, and is an example of the image processing apparatus.

The ADF 1 is an automatic document feeding device which includes a document sheet setting portion, a plurality of conveying rollers, a document sheet pressing, and a sheet discharge portion that are not shown, and conveys a document sheet in such a way as to be read by the image reading portion 2.

The image forming portion 3 is configured to form an image by the electrophotography based on image data read by the image reading portion 2, or image data input from an external information processing apparatus such as a personal computer. In the image forming portion 3, an image is formed onto a sheet supplied from the sheet feed portion 4, and the sheet with the image formed thereon is discharged onto a sheet discharge tray.

The operation display portion 6 displays various types of information based on control instructions sent from the control portion 5. The control portion 5 includes control equipment such as CPU, ROM, RAM, and EEPROM (registered trademark) that are not shown. The ROM of the control portion 5 stores in advance a print color mode switching program which causes the CPU of the control portion 5 to execute a print color mode switching process (see the flowchart shown in FIG. 3) that is described below.

Meanwhile, there is known a problem where, when the color type of each of a plurality of pages of document sheets is determined based on the contents of the whole area of each page, a large load is imposed on the color type determination process. In view of this problem, as described below, the image forming apparatus 10 is configured to reduce the load on the color type determination process when images are printed based on image data of a plurality of pages of document sheets.

As shown in FIG. 2, the control portion 5 includes a copy processing portion 51, a second determination portion 52, a second determination target excluding portion 53, a first determination portion 54, a first determination target excluding portion 55, a print color mode switching portion 56, and a setting processing portion 57. The control portion 5 functions as the copy processing portion 51, second determination portion 52, second determination target excluding portion 53, first determination portion 54, first determination target excluding portion 55, print color mode switching portion 56, and setting processing portion 57, when it executes, by using the CPU, the print color mode switching program stored in the ROM. It is noted that when the control portion 5 is an electronic circuit, the copy processing portion 51, second determination portion 52, second determination target excluding portion 53, first determination portion 54, first determination target excluding portion 55, print color mode switching portion 56, and setting processing portion 57 are configured as modules included in the control portion 5.

The copy processing portion 51 executes a copy process by controlling the ADF 1, image reading portion 2 and image forming portion 3 when instructed by the user to copy a set of document sheets placed on the ADF 1 through an operation input performed to the operation display portion 6. During the copy process, a plurality of pages of document sheets are copied in a print color mode, namely a color mode or a monochrome mode, that has been set in advance. Specifically, when the print color mode has been set to the color mode, the copy processing portion 51 causes the image forming portion 3 to form a color image which is composed of toners of colors C (cyan), M (magenta), Y (yellow) and K (black). In addition, when the print color mode has been set to the monochrome mode, the copy processing portion 51 causes the image forming portion 3 to form a monochrome image which is composed of toner of K (black). Here, the copy processing portion 51 is an example of the print processing portion of the present disclosure. During the copy process, image data of the document sheets placed on the ADF 1 is read sequentially page by page by the image reading portion 2, and based on the read image data of the document sheets, images are formed by the image forming portion 3 onto sheets. It is noted that the copy processing portion 51 causes the image forming portion 3 to form the images in parallel with the determination performed by the second determination portion 52 or the first determination portion 54.

The copy processing portion 51 executes the copy process in the print color mode that has been set in the initial setting of the image forming apparatus 10, or the print color mode that has been set by an operation input performed by the user to the operation display portion 6.

The second determination portion 52 determines, for each page of the document sheets in the image data, whether or not each of a plurality of divided areas is an area of a background color, wherein the plurality of divided areas and the background color have been set in advance. Specifically, the second determination portion 52 determines whether or not each divided area is a background-color area based on the image data of the document sheet that was read during the copy process.

For example, the second determination portion 52 may determine that a divided area is a background-color area when data of all pixels of the divided area is the same as the background-color data or is within a predetermined range of closeness to the background-color data. Here, each divided area is a rectangular area obtained by dividing each page of document sheet equally in a main scanning direction and a sub scanning direction. In addition, the background color is, for example, white.

The second determination target excluding portion 53, when the second determination portion 52 determines that one or more divided areas among the plurality of divided areas are background-color areas in a second set number or more of pages of the document sheets in the image data, excludes the one or more divided areas from determination targets of the first determination portion 54, wherein the second set number has been set in advance. The second set number represents the number of pages and can be set, as appropriate, to a number in the range of 2 to 10, for example.

The first determination portion 54 determines, for each page of the document sheets in the image data, whether or not each of the plurality of divided areas is of a color type that is different from the print color mode. Here, the first determination portion 54 starts the determination after the second determination portion 52 has performed its own determination onto a second determination number of pages of the document sheets in the image data, wherein the second determination number has been set in advance. It is noted that the second determination number is equal to or larger than the second set number, and for example, equal to the second set number. Furthermore, the first determination portion 54 performs the determination on remaining divided areas that have remained among the plurality of divided areas after the exclusion of divided areas from the determination targets by the second determination target excluding portion 53.

Specifically, the first determination portion 54 determines whether or not each of the plurality of divided areas is of a color type that is different from the print color mode, based the image data of the RGB format that has been read by the image reading portion 2 and input to the control portion 5. For example, when a difference between the largest value and the smallest value among the brightness values of the RGB components included in the pixel data is in a predetermined range, the first determination portion 54 determines that the pixel is a colored pixel, and when the difference is out of the predetermined range, the first determination portion 54 determines that the pixel is a non-colored pixel. The first determination portion 54 performs this determination onto each pixel included in the divided area, and adds up the number of colored pixels and the number of non-colored pixels in the divided area. This makes it possible to determine whether or not the divided area is of a color type that is different from the print color mode, based on the ratio of the number of colored pixels or the number of non-colored pixels to the total number of pixels in the divided area. It is noted that the first determination portion 54 may determine whether or not the divided area is of a color type that is different from the print color mode, based on image data that has been converted from the RGB format to another data format such as the CMYK format after the image data was input from the control portion 5.

The first determination target excluding portion 55, when the first determination portion 54 determines that one or more divided areas among the plurality of divided areas are of a color type that is different from the print color mode in a first set number or more of pages of the document sheets in the image data, excludes the one or more divided areas from the determination targets of the first determination portion 54 thereafter, wherein the first set number has been set in advance. The first set number represents the number of pages and can be set, as appropriate, to a number in the range of 2 to 10, for example.

Specifically, the first determination target excluding portion 55 determines, every first determination number of pages, whether or not there is a divided area that was determined by the first determination portion 54 as being of a color type that is different from the print color mode in the first set number of pages of the document sheets in succession, wherein the first determination number has been set in advance. It is noted that the first determination number is equal to or larger than the first set number, and for example, equal to the first set number.

The print color mode switching portion 56 is configured to be able to switch the print color mode during the copy process when the number of divided areas that are the determination targets of the first determination portion 54 becomes a predetermined number or smaller. For example, the print color mode switching portion 56 can switch the print color mode during the copy process when the number of divided areas that are the determination targets of the first determination portion 54 becomes 0.

Specifically, when the number of divided areas that are the determination targets of the first determination portion 54 becomes the predetermined number or smaller, the print color mode switching portion 56 displays an operation screen for receiving an operation instructing to switch the print color mode, and upon receiving of the operation instructing to switch the print color mode, the print color mode switching portion 56 switches the print color mode. For example, when the number of divided areas that are the determination targets of the first determination portion 54 becomes 0, the print color mode switching portion 56 displays a switch operation screen (an example of the operation screen of the present disclosure) on the operation display portion 6 for receiving the switch operation. Subsequently, upon receiving of the switch operation on the switch operation screen, the print color mode switching portion 56 switches the print color mode.

The setting processing portion 57 is configured to set, in response to a predetermined setting operation, one or more of the first set number, the first determination number, the second set number, and the second determination number. For example, in response to an operation input performed by the user to the operation display portion 6, the setting processing portion 57 displays a setting operation screen on the operation display portion 6 to allow the user to perform the setting operation. Subsequently, in response to the setting operation input from the setting operation screen, the setting processing portion 57 sets the first set number, the first determination number, the second set number, and the second determination number.

[Print Color Mode Switching Process]

Figure 3:
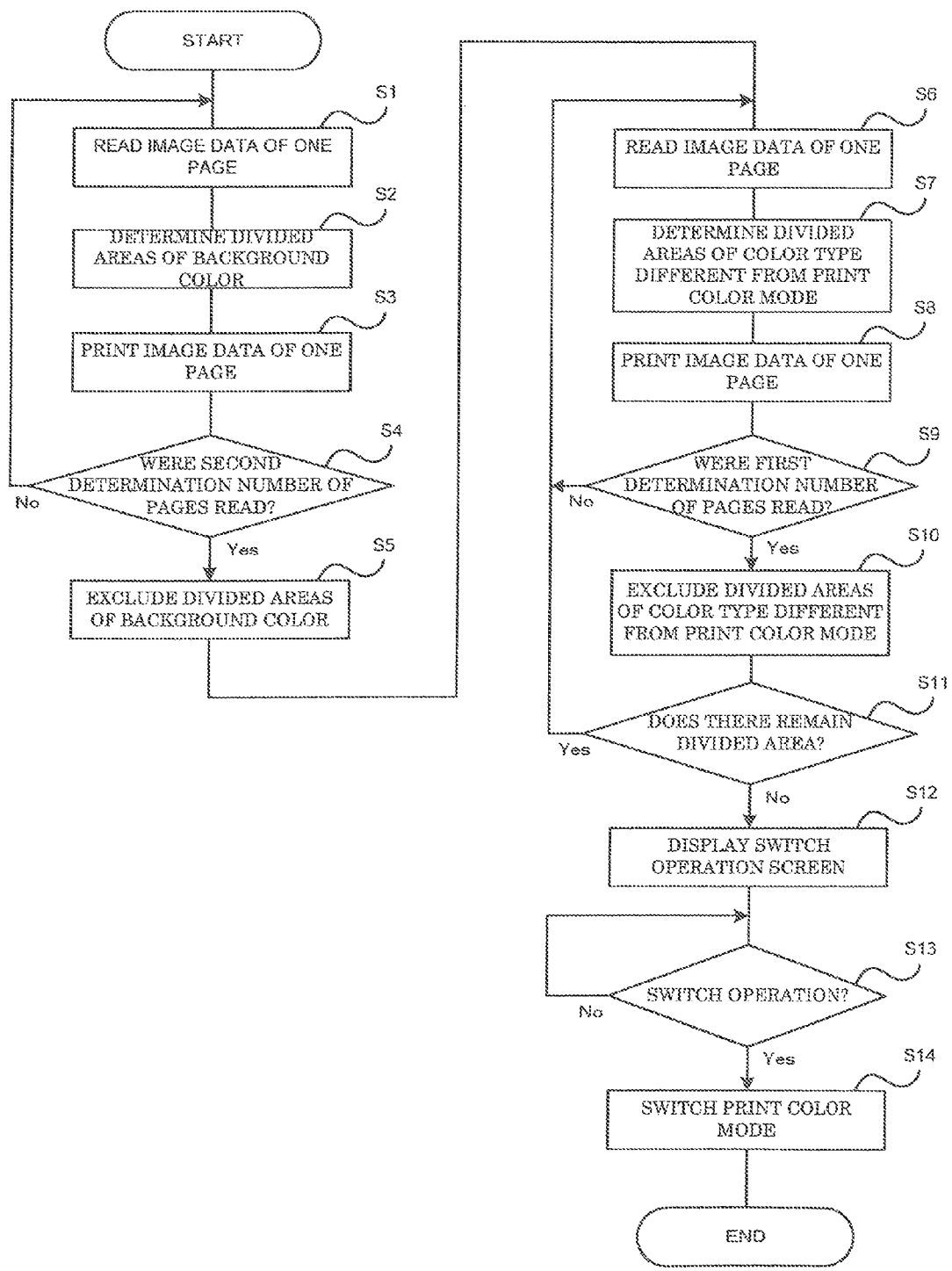
FIG. 3 is a flowchart showing an example of a print color mode switching process that is executed in the image forming apparatus according to an embodiment of the present disclosure.

The following describes, with reference to FIG. 3, an example of the procedure of the print color mode switching process that is executed by the control portion 5 in the image forming apparatus 10 based on the print color mode switching program. Here, steps S1, S2, . . . represent numbers of the processing procedures (steps) executed by the control portion 5. It is noted that the print color mode switching process is executed when the user has instructed to copy a set of document sheets placed on the ADF 1 through an operation input performed to the operation display portion 6.

<Step S1>

First, in step S1, the control portion 5 reads image data of one page from document sheets placed on the ADF 1. Specifically, the control portion 5 controls the ADF 1 to feed a top sheet among the document sheets placed on the document sheet setting portion such that the fed document sheet is conveyed to pass through a reading position where image data is read by the image reading portion 2. The control portion 5 then controls the image reading portion 2 to read image data of one page from the document sheet while it is conveyed and passing through the reading position. Here, the process of step S1 is executed by the copy processing portion 51 of the control portion 5.

<Step S2>

In step S2, the control portion 5 determines whether or not each of a plurality of divided areas is a background-color area based on the image data read from the document sheet in the step S1. Specifically, the control portion 5 determines that a divided area is a background-color area when data of all pixels of the divided area is the same as the data representing the color white or is within a predetermined range of closeness to the data representing the color white. Here, the process of the step S2 is executed by the second determination portion 52 of the control portion 5.

<Step S3>

In step S3, the control portion 5 executes the print process and causes the image forming portion 3 to form an image based on the image data of the document sheet on which the determination process of the step S2 was executed. Specifically, the control portion 5 causes the image forming portion 3 to form a color or monochrome image in the print color mode that has been set in the initial setting of the image forming apparatus 10, or in the print color mode that has been specified by the user by performing an operation input to the operation display portion 6. Here, the process of step S1 is an example of the first step of the present disclosure, and is executed by the copy processing portion 51 of the control portion 5.

Here, in the print color mode switching process, the processes of the steps S1 through S3 are executed in parallel with each other. That is, in parallel with forming of a color or monochrome image based on image data of a page of the document sheets in the step S3, the determination process of the step S2 is performed on image data of the next page of the document sheets. Furthermore, in parallel with the determination process of the step S2, image data of the next page following the page of the step S2 is read from the document sheets in the step S1.

<Step S4>

In step S4, the control portion 5 determines whether or not the second determination number of pieces of image data were read in the step S1.

Here, upon determining that the second determination number of pieces of image data were read (Yes side at S4), the control portion 5 moves the process to step S5. In addition, upon determining that the second determination number of pieces of image data have not been read (No side at S4), the control portion 5 returns the process to step S1, and causes the image reading portion 2 to read image data of the next page from the document sheets. It is noted that when all of the document sheets placed on the document setting portion of the ADF 1 are read and printed before the second determination number of pieces of image data are read in the step S1, the control portion 5 ends the print color mode switching process.

<Step S5>

In step S5, the control portion 5 excludes, from the determination targets of step S7 regarding the color type, one or more divided areas that were determined in the step S2, from among the plurality of divided areas, as the background-color areas in the second set number or more of pages of the document sheets in the image data. That is, in the print color mode switching process, the divided areas that are determined as the background-color areas in the second set number or more of pages of the document sheets in the image data, are regarded as the background-color areas. Here, the process of the step S5 is executed by the second determination target excluding portion 53 of the control portion 5.

For example, the control portion 5 detects the divided areas that were determined as the background-color areas in the second set number or more of pages of the document sheets in the image data, by counting the number of times that a divided area was determined as the background-color area in the step S2. With the process of the step S5, the blank areas of the document sheets are excluded from the determination targets of the step S7 regarding the color type. This reduces the processing load of the control portion 5 that executes the process of the step S7. It is noted that in the print color mode switching process, the processes of the steps S1 through S5 may be omitted.

<Step S6>

In step S6, as in the step S1, the control portion 5 reads image data of one page from the document sheets placed on the ADF 1. Here, the process of the step S6 is executed by the copy processing portion 51 of the control portion 5.

<Step S7>

In step S7, the control portion 5 determines, based on the image data read from the document sheets in the step S6, whether or not each of the plurality of divided areas is of a color type that is different from the print color mode. Here, the control portion 5 performs the determination on remaining divided areas that have remained among the plurality of divided areas after the exclusion in the step S5 and/or step S10 of divided areas from determination targets. Here, the process of the step S7 is an example of the second step of the present disclosure, and is executed by the first determination portion 54 of the control portion 5.

Specifically, the control portion 5 adds up the number of colored pixels and the number of non-colored pixels included in the divided area. Subsequently, the control portion 5 determines whether or not the divided area is of a color type that is different from the print color mode, based on the ratio of the number of colored pixels or the number of non-colored pixels to the total number of pixels included in the divided area. For example, in the case where the print color mode has been set to the color mode, when the ratio of the number of non-colored pixels to the total number of pixels in the divided area exceeds 90%, the control portion 5 determines that the divided area is of a color type that is different from the print color mode. As another example, in the case where the print color mode has been set to the monochrome mode, when the ratio of the number of colored pixels to the total number of pixels in the divided area exceeds 50%, the control portion 5 determines that the divided area is of a color type that is different from the print color mode.

<Step S8>

In step S8, as in the step S3, the control portion 5 executes the print process and causes the image forming portion 3 to form an image based on the image data of the document sheet on which the determination process of the step S7 was executed. Here, the process of step S8 is an example of the first step of the present disclosure, and is executed by the copy processing portion 51 of the control portion 5.

Here, in the print color mode switching process, as is the case with the processes of the steps S1 through S3, the processes of the steps S6 through S8 are executed in parallel with each other. With this configuration, compared to a configuration in which the image forming portion 3 is caused to form an image after the determination is performed onto the plurality of pages of the document sheets in the image data, it is possible to reduce the time from the start of the print color mode switching process to the start of the image forming process. In addition, it is possible to eliminate a configuration for storing, until the image forming portion 3 starts the image forming process, the image data of document sheets on which the determination process of the step S7 was executed. This makes it possible to simplify the configuration of the image forming apparatus 10.

<Step S9>

In step S9, the control portion 5 determines whether or not the first determination number of pieces of image data were read in the step S6.

Here, upon determining that the first determination number of pieces of image data were read (Yes side at S9), the control portion 5 moves the process to step S10. In addition, upon determining that the first determination number of pieces of image data have not been read (No side at S9), the control portion 5 returns the process to the step S6, and causes the image reading portion 2 to read image data of the next page from the document sheets. It is noted that when all of the document sheets placed on the document setting portion of the ADF 1 are read and printed before the first determination number of pieces of image data are read in the step S6, the control portion 5 ends the print color mode switching process.

Step S10>

In step S10, the control portion 5, every first determination number of pages, excludes, from determination targets of the step S7, divided areas that were determined in the step S7 as being of a color type that is different from the print color mode in the first set number of pages of the document sheets in the image data in succession. That is, in the print color mode switching process, the divided areas that were determined as being of a color type that is different from the print color mode in the first set number of pages of the document sheets in the image data in succession, are regarded as areas of a color type that is different from the print color mode. Here, the process of the step S10 is an example of the third step of the present disclosure, and is executed by the first determination target excluding portion 55 of the control portion 5.

The control portion 5 can detect the divided areas that were determined as being of a color type that is different from the print color mode in the first set number of pages of the document sheets in the image data in succession, by, as in the step S5, counting the number of times that a divided area was determined as being of a color type that is different from the print color mode in the step S7, for example. With the process of the step S10, the divided areas that were determined as being of a color type that is different from the print color mode are excluded from the determination targets of the step S7. This reduces the processing load of the control portion 5 that executes the process of the step S7.

Here, in the process of the step S10, the divided areas that were determined as being of a color type that is different from the print color mode in the first set number of pages of the document sheets in the image data in succession, are regarded as areas of a color type that is different from the print color mode. This improves the determination accuracy in determining the color type on the image data of a plurality of pages of document sheets.

In addition, in the process of the step S10, it is determined every first determination number of pages whether or not there is a divided area that was determined as being of a color type that is different from the print color mode in the first set number of pages of the document sheets in the image data in succession. This eliminates the need to determine, for each process of the step S7, whether or not there is a divided area that was determined as being of a color type that is different from the print color mode in the first set number of pages of the document sheets in the image data in succession. This reduces the processing load of the control portion 5 that executes the process of the step S10.

<Step S11>

In step S11, the control portion 5 determines whether or not there remains a divided area that is to be a determination target of the step S7.

Here, upon determining that there remains a divided area that is a determination target of the step S7 (Yes side at S11), the control portion 5 returns the process to step S6, and causes the image reading portion 2 to read image data of the next page from the document sheets. In addition, upon determining that there does not remain a divided area that is to be a determination target of the step S7 (No side at S11), the control portion 5 moves the process to step S12.

<Step S12>

In step S12, the control portion 5 stops the copy process executed in the steps S6 and S8, and displays the switch operation screen on the operation display portion 6. This makes it possible to switch the print color mode in the middle of the copy process when the color type of a plurality of pages of document sheets to be copied is different from the print color mode.

<Step S13>

In step S13, the control portion 5 determines whether or not the switch operation was received on the switch operation screen displayed in the step S12.

Here, upon determining that the switch operation was received (Yes side at S13), the control portion 5 moves the process to step S14. In addition, upon determining that the switch operation has not been received (No side at S13), the control portion 5 waits for the switch operation to be received in the step S13. It is noted that when an operation input to maintain the current print color mode was received on the switch operation screen, the control portion 5 resumes the copy process without switching the print color mode. This prevents the print color mode from being switched against the will of the user. In addition, when an operation input to end the copying of the document sheets was received on the switch operation screen, the control portion 5 ends the print color mode switching process, for example. Furthermore, as another embodiment, the processes of the steps S12 and S13 may be omitted, and when it is determined in the step S7 that there does not remain a divided area that is to be a determination target of the step S7, the control portion 5 may automatically switch the print color mode.

<Step S14>

In step S14, the control portion 5 switches the print color mode based on the switch operation received in the step S13 and resumes the copy process that was stopped in the step S12. Subsequently, the control portion 5 ends the print color mode switching process after all pages of the document sheets placed on the document sheet setting portion are copied by the copy process. Here, the processes of the steps S11 through S14 are an example of the fourth step of the present disclosure, and are executed by the print color mode switching portion 56 of the control portion 5.

It is noted that the first set number, the first determination number, the second set number, and the second determination number that are used in the print color mode switching process can be changed arbitrarily by the user. Specifically, in response to an operation input performed by the user to the operation display portion 6, the control portion 5 displays the setting operation screen on the operation display portion 6. This allows the user to arbitrarily change the settings of the first set number and the like by performing the setting operation on the setting operation screen. In addition, the control portion 5 may be configured to obtain the number of document sheets placed on the ADF 1, and set the first set number and the like based on the obtained number of document sheets.

[Determination Examples of Color Type]

Figure 4:
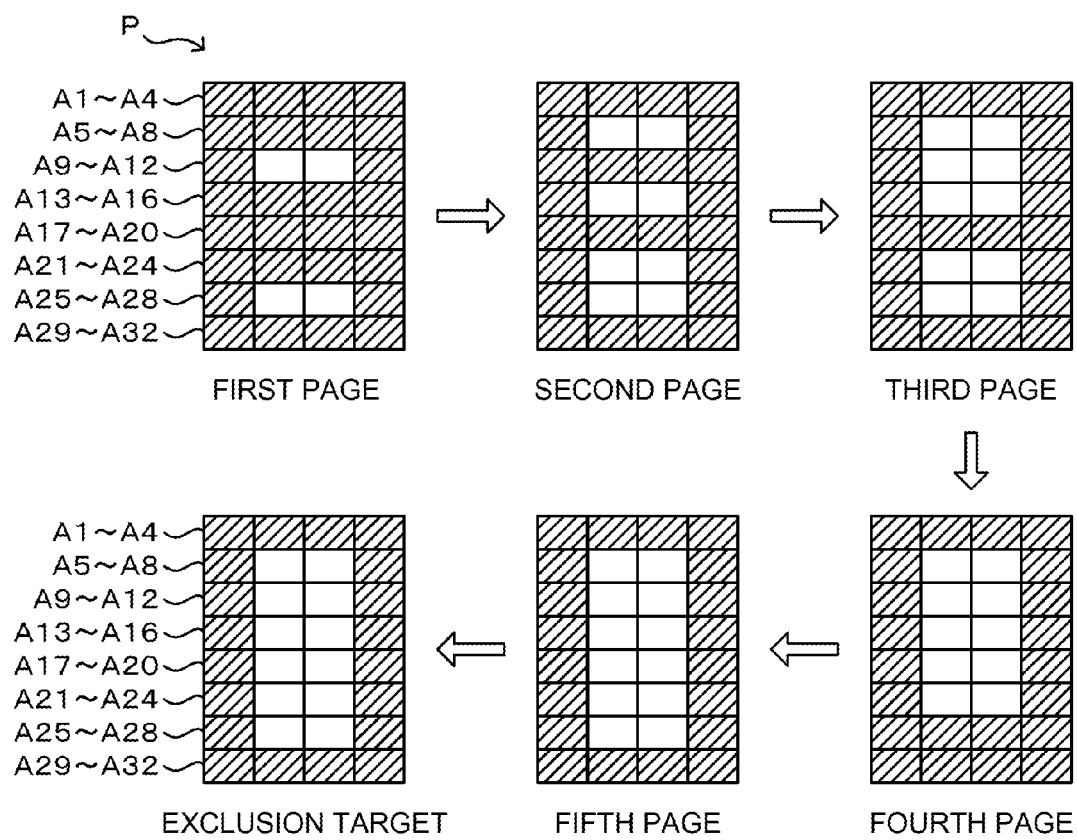
FIG. 4 is a diagram showing an example of how the color type of a document sheet is determined in the print color mode switching process that is executed in the image forming apparatus according to an embodiment of the present disclosure.
Figure 5:
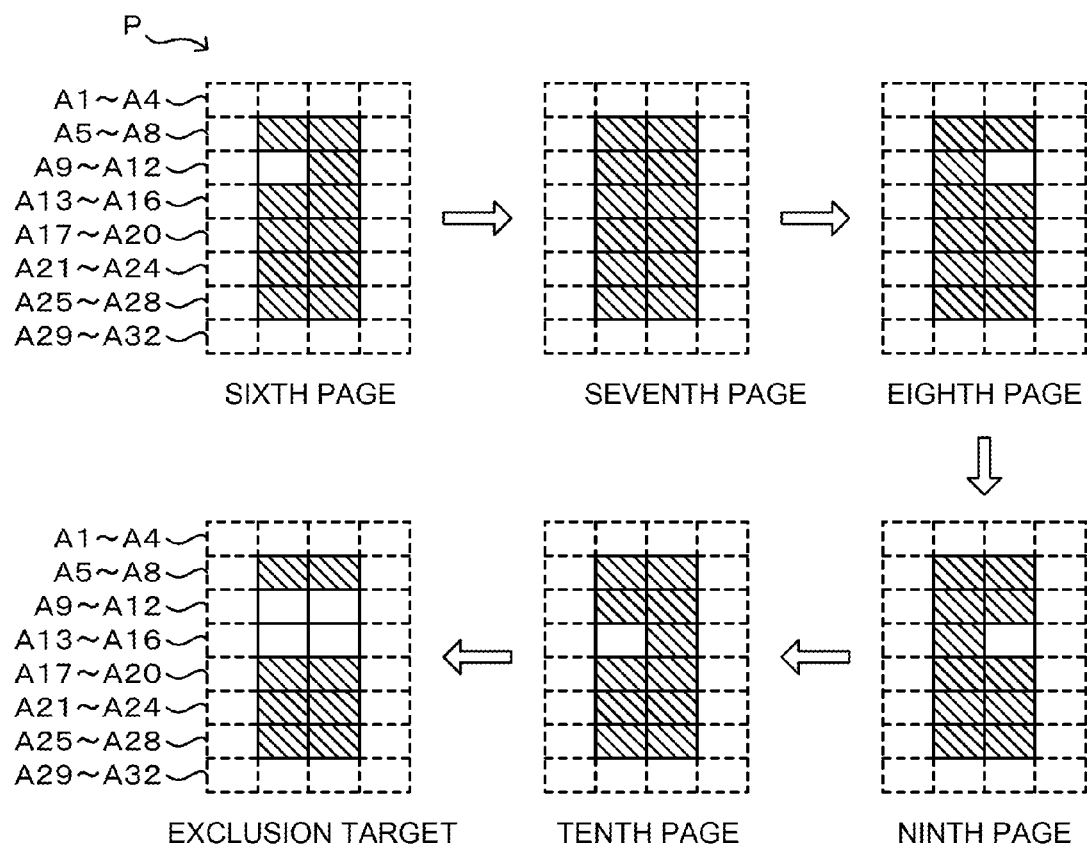
FIG. 5 is a diagram showing an example of how the color type of a document sheet is determined in the print color mode switching process that is executed in the image forming apparatus according to an embodiment of the present disclosure.

The following describes examples of how the color type of a plurality of pages of document sheets is determined in the print color mode switching process, with reference to FIGS. 4-6. Here, in FIGS. 4-6, "P" represents pages of the document sheets in the image data, and "A1"-"A32" respectively represent divided areas that are set on each page of the document sheets. In FIG. 4, in the top row of the document sheet P, divided areas A1-A4 are arranged in order of A1, A2, A3 and A4 from left to right in the drawing. The arrangement order of the divided areas applies to the other rows from the next row to the bottom row, as well. In addition, in FIG. 4, the hatched divided areas represent white (background-color) areas. In addition, in FIGS. 5 and 6, the hatched divided areas represent monochrome areas. Furthermore, in FIGS. 5 and 6, the divided areas surrounded by the dotted line represent the areas that were excluded from the determination targets of the color type.

It is noted that in the following description, it is supposed that 32 divided areas are set in each page of document sheet, wherein the 32 divided areas are obtained by dividing each page into four equally sized parts in the main scanning direction and eight equally sized parts in the sub scanning direction. In addition, it is supposed that the first set number, the first determination number, the second set number, and the second determination number have all been set to 5 (five). Furthermore, it is supposed that the print color mode switching process is executed in the state where the print color mode has been set to the color mode.

First, when the print color mode switching process is started, the control portion 5 determines whether or not each divided area is a white area, with respect to the image data of the first page read from document sheets placed on the ADF 1. For example, in the case of the first page shown in FIG. 4, the control portion 5 determines that the divided areas, except for divided areas A10-A11 and A26-A27, are white areas.

The control portion 5 performs similar processing repeatedly onto the image data of the second to fifth pages read from the document sheets. Subsequently, after the determination on the image data of the fifth page is completed, the control portion 5 regards, as the white areas, the divided areas that were determined as the white areas in five pages of the document sheets in the image data, and exclude the divided areas from the determination targets thereafter. For example, in the case of the first to fifth pages shown in FIG. 4, the control portion 5 regards divided areas A1-A5, A8-A9, A12-A13, A16-A17, A20-A21, A24-A25, and A28-A32 as the white areas, and exclude these divided areas from the determination targets of the color type thereafter.

Next, the control portion 5 determines whether or not each divided area is a monochrome area, based on the image data of the sixth page read from the document sheets. For example, in the case of the image data of the sixth page shown in FIG. 5, the control portion 5 determines that the divided areas except for divided area A10 are monochrome areas.

Subsequently, the control portion 5 performs similar processing repeatedly onto the image data of the seventh to tenth pages read from the document sheets. Subsequently, after the determination on the image data of the tenth page is completed, the control portion 5 regards the divided areas that were determined as the monochrome areas in five pages in the image data in succession, as the monochrome areas and exclude the divided areas from the determination targets of the color type thereafter. For example, in the case of the sixth to tenth pages shown in FIG. 5, the control portion 5 regards divided areas A6-A7, A18-A19, A22-A23, and A26-A27 as the monochrome areas, and exclude these divided areas from the determination targets of the color type thereafter.

Next, the control portion 5 performs processing that is similar to the processing performed onto the image data of the sixth to tenth pages, repeatedly onto the image data of the eleventh to fifteenth pages read from the document sheets. Subsequently, after the determination on the image data of the fifteenth page is completed, the control portion 5 regards the divided areas that were determined as the monochrome areas in five pages in the image data in succession, as the monochrome areas and exclude these divided areas from the determination targets of the color type thereafter. For example, in the case of the eleventh to fifteenth pages shown in FIG. 6, the control portion 5 regards divided areas A10-A11 and A14-A15 as the monochrome areas, and exclude these divided areas from the determination targets of the color type thereafter. Here, there does not remain a divided area that is to be a determination target of the color type.

Subsequently, since there does not remain a divided area that is to be a determination target of the color type, the control portion 5 displays a message on the operation display portion 6 to indicate that the document sheets were determined as monochrome document sheets, and displays the switch operation screen and urges the user to switch the print color mode from the color mode to the monochrome mode.

In this way, in the print color mode switching process, the color type of each of a plurality of divided areas is determined for each page of the document sheets. In addition, the divided areas that were determined as being of a color type that is different from the print color mode in the first set number or more of pages of the document sheets in the image data, are regarded as areas of a color type that is different from the print color mode and are excluded from the determination targets of the color type. With this configuration, it is possible to reduce the load on the color type determination process when images are printed based on image data of a plurality of pages of document sheets.

Other Embodiments

Meanwhile, the print color mode switching process may be executed when a stack of document sheets placed on the document sheet table of the image reading portion 2 are copied. For example, the print color mode switching process may be executed when the copy process is repeatedly performed at time intervals within a predetermined range to the stack of document sheets placed on the document sheet table.

In addition, the present disclosure is applicable to a case where, in the image forming apparatus 10, color or monochrome images are formed based on print data transmitted from an external information processing apparatus. In this case, the print color mode switching portion 56 of the control portion 5 may display the switch operation screen on the display portion of the information processing apparatus that has transmitted the print data.

Furthermore, the information processing apparatus that transmits the print data to the image forming apparatus 10 for color or monochrome images to be formed, may be configured as the image processing apparatus of the present disclosure. Specifically, the control portion of the information processing apparatus may include configurations that correspond to the second determination portion 52, second determination target excluding portion 53, first determination portion 54, first determination target excluding portion 55, print color mode switching portion 56, and setting processing portion 57 of the image forming apparatus 10. In addition, the control portion of the information processing apparatus may include a print processing portion that transmits the print data to the image forming apparatus 10 and causes the image forming apparatus 10 to perform the print process.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
a print processing portion configured to execute, in a print color mode which is either a color mode or a monochrome mode, a print process based on image data of a plurality of pages of document sheets, the print color mode having been set in advance;
a first determination portion configured to determine, for each page of the document sheets in the image data, whether or not each of a plurality of divided areas is of a color type that is different from the print color mode, the plurality of divided areas having been set in advance;
a first determination target excluding portion configured to, when the first determination portion determines that one or more divided areas among the plurality of divided areas are of a color type that is different from the print color mode in a first set number or more of pages of the document sheets in the image data, exclude the one or more divided areas from determination targets of the first determination portion thereafter, the first set number having been set in advance;
a print color mode switching portion configured to be able to switch the print color mode during the print process when the number of divided areas that are the determination targets of the first determination portion becomes a predetermined number or smaller;
a second determination portion configured to determine, for each page of the document sheets in the image data, whether or not each of the plurality of divided areas is an area of a background color, the background color having been set in advance; and
a second determination target excluding portion configured to exclude, from the determination targets of the first determination portion, one or more divided areas that were determined, by the second determination portion, from among the plurality of divided areas as areas of the background color in a second set number or more of pages of the document sheets in the image data, the second set number having been set in advance, wherein
after the second determination portion has performed its own determination to a second determination number of pages of the document sheets in the image data, the first determination portion repeats the determination until all of the divided areas are excluded from the determination targets of the first determination portion, the second determination number having been set in advance and being equal to or larger than the second set number, and
when all of the divided areas are excluded from the determination targets of the first determination portion, the print color mode switching portion displays an operation screen for receiving a switch operation, when the switch operation is received on the operation screen, the print color mode switching portion switches the print color mode in a middle of the print process, and when an operation input instructing to maintain a current color mode is received on the operation screen, the print color mode switching portion does not switch the print color mode.

2. The image processing apparatus according to claim 1, wherein
the first determination target excluding portion excludes, from the determination targets, divided areas that were determined by the first determination portion as being of the color type that is different from the print color mode in the first set number of pages of the document sheets in the image data in succession.

3. The image processing apparatus according to claim 1, wherein
the first determination target excluding portion determines, every first determination number of pages, whether or not there is a divided area that was determined by the first determination portion as being of the color type that is different from the print color mode in the first set number of pages of the document sheets in the image data, the first determination number having been set in advance and being equal to or larger than the first set number.

4. The image processing apparatus according to claim 1, wherein
the print processing portion executes the print process in parallel with the determining performed by the first determination portion.

5. The image processing apparatus according to claim 1 further comprising:
a setting processing portion configured to set, in response to a predetermined setting operation, one or more of the first set number, the first determination number, the second set number, and the second determination number.

6. An image forming apparatus comprising:
the image processing apparatus according to claim 1; and
an image forming portion configured to form an image based on the image data of the document sheets.

7. An image processing method comprising:
a first step of executing, in a print color mode which is either a color mode or a monochrome mode, a print process based on image data of a plurality of pages of document sheets, the print color mode having been set in advance;
a second step of determining, for each page of the document sheets in the image data, whether or not each of a plurality of divided areas is of a color type that is different from the print color mode, the plurality of divided areas having been set in advance;
a third step of, when the second step determines that one or more divided areas among the plurality of divided areas are of a color type that is different from the print color mode in a first set number or more of pages of the document sheets in the image data, excluding the one or more divided areas from determination targets of the second step thereafter, the first set number having been set in advance;
a fourth step of switching the print color mode during the print process when the number of divided areas that are the determination targets of the second step becomes a predetermined number or smaller;
a fifth step of determining, for each page of the document sheets in the image data, whether or not each of the plurality of divided areas is an area of a background color, the background color having been set in advance; and
a sixth step of excluding, from the determination targets of the second step, one or more divided areas that were determined, in the fifth step, from among the plurality of divided areas as areas of the background color in a second set number or more of pages of the document sheets in the image data, the second set number having been set in advance, wherein
after performing a determination to a second determination number of pages of the document sheets in the image data in the fifth step, the determination is repeated until all of the divided areas are excluded from the determination targets of the second step, the second determination number having been set in advance and being equal to or larger than the second set number, and
when all of the divided areas are excluded from the determination targets of the second step, an operation screen for receiving a switch operation is displayed, when the switch operation is received on the operation screen, the print color mode is switched in a middle of the print process, and when an operation input instructing to maintain a current color mode is received on the operation screen, the print color mode is not switched.

* * * * *